United States Patent
Kawano et al.

(10) Patent No.: US 10,685,242 B2
(45) Date of Patent: Jun. 16, 2020

(54) LANE DETECTION APPARATUS

(71) Applicant: DENSO CORPORATION, Kariya, Aichi-pref. (JP)

(72) Inventors: Taiki Kawano, Nishio (JP); Naoki Kawasaki, Kariya (JP); Naoki Nitanda, Kariya (JP); Kenta Hoki, Kariya (JP)

(73) Assignee: DENSO CORPORATION, Kariya, Aichi-Pref (JP)

( * ) Notice: Subject to any disclaimer, the term of this patent is extended or adjusted under 35 U.S.C. 154(b) by 188 days.

(21) Appl. No.: 15/871,706

(22) Filed: Jan. 15, 2018

(65) Prior Publication Data
US 2018/0204073 A1 Jul. 19, 2018

(30) Foreign Application Priority Data

Jan. 16, 2017 (JP) ................. 2017-005348

(51) Int. Cl.
G06K 9/00 (2006.01)
G06T 7/73 (2017.01)
B60W 30/12 (2020.01)
G06T 7/13 (2017.01)

(52) U.S. Cl.
CPC ......... *G06K 9/00798* (2013.01); *B60W 30/12* (2013.01); *G06T 7/13* (2017.01); *G06T 7/74* (2017.01); *G06T 2207/30256* (2013.01)

(58) Field of Classification Search
None
See application file for complete search history.

(56) References Cited

U.S. PATENT DOCUMENTS

| | | | | |
|---|---|---|---|---|
| 6,577,334 B1 * | 6/2003 | Kawai | ................ | B60G 17/0165 |
| | | | | 348/148 |
| 9,988,048 B1 * | 6/2018 | Song | .................... | B60W 30/12 |
| 2008/0114532 A1 * | 5/2008 | Nishida | .................. | G08G 1/167 |
| | | | | 701/514 |
| 2010/0030430 A1 * | 2/2010 | Hayakawa | .......... | B60T 8/17557 |
| | | | | 701/42 |
| 2011/0010021 A1 * | 1/2011 | Kobayashi | .......... | B60T 8/17557 |
| | | | | 701/1 |
| 2012/0099766 A1 * | 4/2012 | Klein | ................. | G06K 9/00798 |
| | | | | 382/104 |
| 2012/0215377 A1 * | 8/2012 | Takemura | ............. | B60W 30/12 |
| | | | | 701/1 |
| 2012/0327233 A1 * | 12/2012 | Imai | ...................... | G08G 1/167 |
| | | | | 348/148 |
| 2014/0002655 A1 * | 1/2014 | Woo | ....................... | G08G 1/167 |
| | | | | 348/148 |

(Continued)

FOREIGN PATENT DOCUMENTS

| | | | |
|---|---|---|---|
| JP | 2003-178399 | | 6/2003 |
| JP | 2011243161 A | * | 5/2010 |

(Continued)

*Primary Examiner* — Andrae S Allison
(74) *Attorney, Agent, or Firm* — Maschoff Brennan

(57) ABSTRACT

A lane detecting apparatus is provided which obtains at least one type of parameters associated with lane lines on the road and selects one of the lane lines as a reference line using one of the parameters which is most useful in determining the configuration of a lane on a road. The lane detecting apparatus also calculates a lane boundary line using the reference lane line.

11 Claims, 11 Drawing Sheets

(56) References Cited

U.S. PATENT DOCUMENTS

| | | | |
|---|---|---|---|
| 2015/0248588 A1* | 9/2015 | Ishigami | G06K 9/00798 382/104 |
| 2015/0332101 A1* | 11/2015 | Takaki | B60R 1/00 382/104 |
| 2016/0012298 A1* | 1/2016 | Maeda | G06K 9/00798 382/104 |
| 2016/0148059 A1* | 5/2016 | Kawano | G06K 9/00798 382/104 |
| 2016/0173831 A1* | 6/2016 | Akamine | G06K 9/00798 348/149 |
| 2016/0188984 A1* | 6/2016 | Kawano | G06K 9/00798 348/148 |
| 2016/0191890 A1* | 6/2016 | Kawano | H04N 13/239 382/154 |
| 2017/0101094 A1* | 4/2017 | Fiaschetti | B60W 30/12 |

FOREIGN PATENT DOCUMENTS

| | | |
|---|---|---|
| JP | 2011-243161 | 12/2011 |
| JP | 2015-079446 | 4/2015 |

* cited by examiner

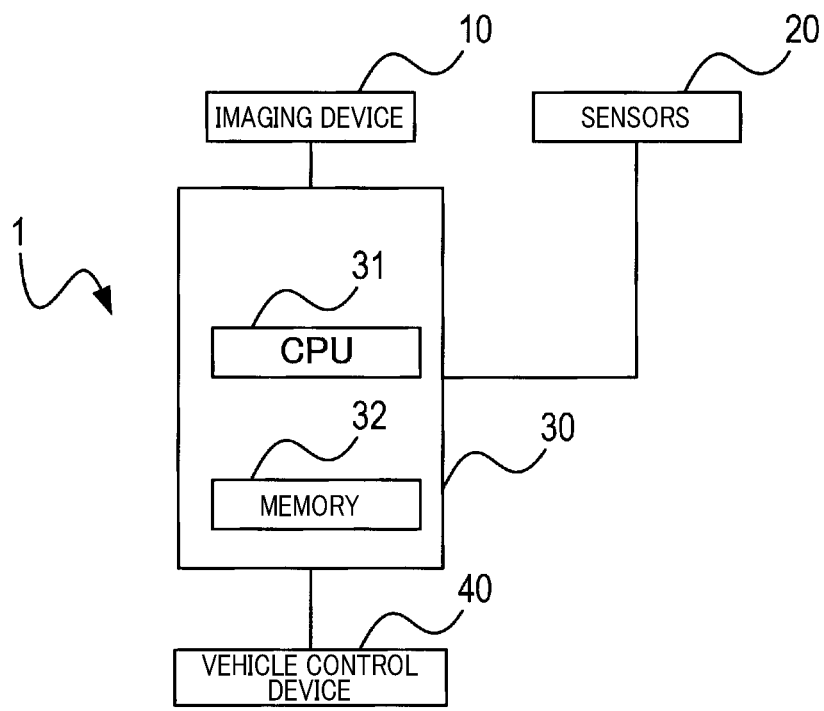
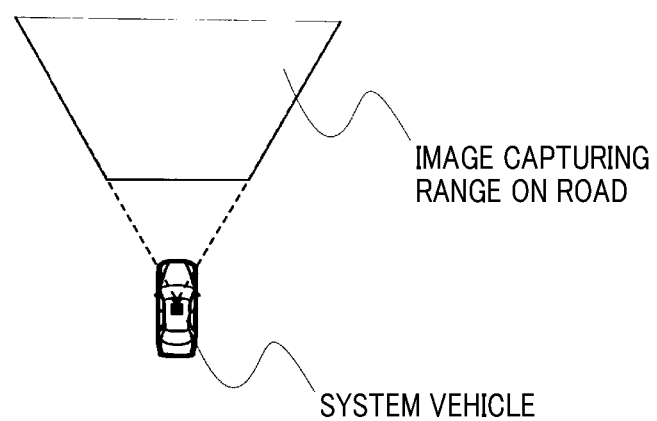

FIG.5
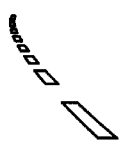
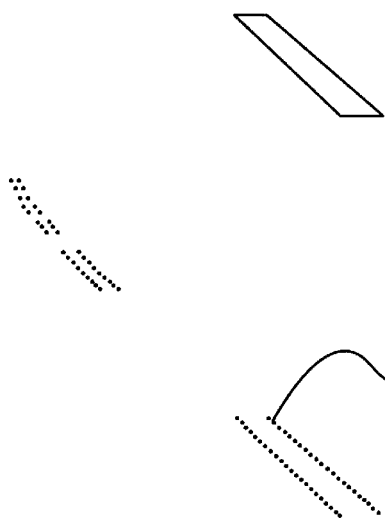
FIG.6
Ep
FIG.7
El
FIG.8
Ht
Ht
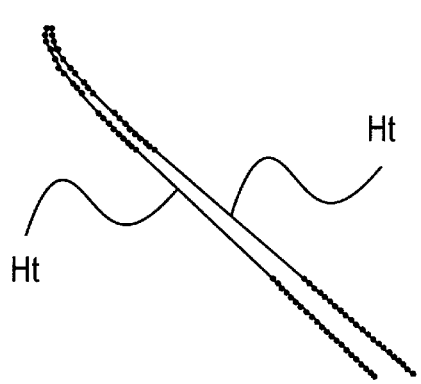

LANE DETECTION APPARATUS

CROSS REFERENCE TO RELATED DOCUMENT

The present application claims the benefit of priority of Japanese Patent Application No. 2017-5348 filed on Jan. 16, 2017, the disclosure of which is incorporated herein by reference.

BACKGROUND

1. Technical Field

The invention relates generally to a lane detection apparatus which works to detect a line appearing in a captured image of a road for use in determining a configuration of a traffic lane on the road.

2. Background Art

A lane detection system is known which is designed to capture an image of a forward view of a vehicle equipped with this system (which will also be referred to below as a system vehicle) using an on-board camera to recognize a lane marking representing a boundary of a traffic lane in which the system vehicle is moving for use with a lane departure warning system which sounds an alarm when the system vehicle is about to unintentionally deviate from the lane.

Japanese Patent First Publication No. 2003-178399 teaches a system which detects lane lines on a road surface to recognize a lane boundary.

The above system, however, faces a problem that when a lane line which should be detected as a lane boundary has partially worn, it may result in a failure in correctly recognizing the lane.

SUMMARY

It is, therefore, an object of this disclosure to provide a technique for selecting a lane line in a captured image of a road for use in determining a configuration of a lane on the road.

According to one aspect of this disclosure, there is provided a lane detection apparatus which comprises: (a) an image acquisition unit which acquires an image in a given lane detection cycle which is captured by an image capturing device mounted in a vehicle; and (b) an image processing unit which includes a lane line detecting unit, a parameter extraction unit, a multiple-line marking determining unit, and a reference line selecting unit.

The lane line detecting unit is configured to detect lane lines on a road in the captured image obtained by the image acquisition unit.

The parameter extraction unit is configured to extract at least one type of lane line parameters which represent measures of usefulness for the respective lane lines detected by the lane line detecting unit in calculating a configuration of a lane on the road in which the vehicle exists.

The multiple-line marking determining unit is configured to determine whether a first lane line and a second lane line constitute a multiple-line marking or not. The first lane line is one of the lane lines detected by the lane line detecting unit. The second lane line is one of the lane lines which is different from the first lane line.

The reference line selecting unit is configured to, when the first lane line and the second lane line are determined to form the multiple-line marking, select one of the first and second lane lines which is determined to be more useful in calculating the configuration of the lane using the lane line parameters, as derived by the parameter extraction unit, and determine the selected one as a reference line for use in determining the configuration of the lane on the road in which the vehicle exists.

In the preferred mode, the image processing unit corrects the reference line to determine a lane boundary line for use in determining a boundary of the lane.

Specifically, the image processing unit offsets a position of the reference line by a given distance and determines it as a position of the lane boundary line.

The given distance is determined as a function of an interval between the reference line and one of the lane lines which is selected as a second lane boundary line that is different from a first lane boundary line which is the lane boundary derived by correcting the reference line. The second lane boundary line is derived by a pattern matching technique.

According to another aspect of this disclosure, there is provided a lane detecting method which comprises the steps of: (a) acquiring an image in a given lane detection cycle which is captured by an image capturing device mounted in a vehicle; (b) detecting lane lines on a road in the captured image obtained by the image acquiring step; (c) extracting at least one type of lane line parameters which represent measures of usefulness for the respective lane lines detected by the lane line detecting step in calculating a configuration of a lane on the road in which the vehicle exists; (d) determining whether a first lane line and a second lane line constitute a multiple-line marking or not, the first lane line being one of the lane lines detected by the lane line detecting step, the second lane line being one of the lane lines which is different from the first lane line; and (e) selecting, when the first lane line and the second lane line are determined to form the multiple-line marking, one of the first and second lane lines which is determined to be more useful in calculating the configuration of the lane using the lane line parameters, as derived by the parameter extracting step, and determining the selected one as a reference line for use in determining a configuration of a lane on the road in which the vehicle exists.

In the preferred mode, the method further comprises correcting the reference line to determine a lane boundary line for use in determining a boundary of the lane.

Specifically, the method shifts or offsets a position of the reference line by a given distance and determines it as a position of the lane boundary line.

The given distance is determined as a function of an interval between the reference line and one of the lane lines which is selected as a second lane boundary line that is different from a first lane boundary line which is the lane boundary derived by correcting the reference line. The second lane boundary line is derived by a pattern matching technique.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 1 is a block diagraph which illustrates a vehicle control system equipped with a lane line detection apparatus according to an embodiment;

FIG. 2 is a view which represents an image capturing road range of an in-vehicle camera;

FIG. 5 is a view which demonstrates a lane line captured by an in-vehicle camera;

FIG. 6 is a view which demonstrates edge points of a lane line captured by captured by an in-vehicle camera;

FIG. 7 is a view which demonstrates edge lines of a lane line captured by an in-vehicle camera;

FIG. 8 is a view which edge points of lane lines which are captured by an in-vehicle camera and subjected to a Hough transform to make continuous lines;

DESCRIPTION OF THE PREFERRED EMBODIMENT

Figure 3:
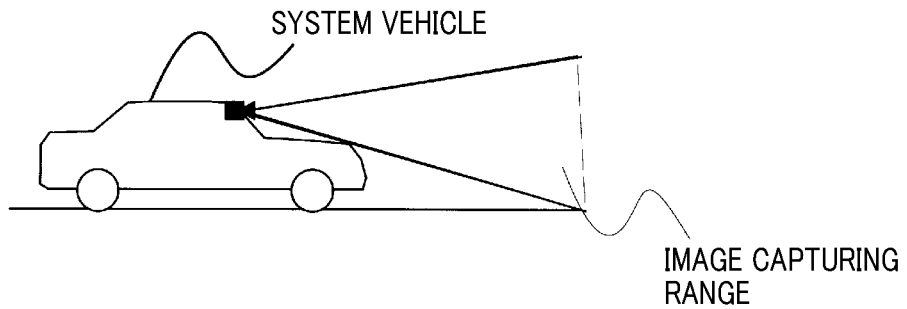
FIG. 3 is a view which represents a location of an in-vehicle camera.

Referring now to the drawings, particularly to FIG. 1, the vehicle control system 1 according to an embodiment includes the image capturing device 10, the sensor group 20, the lane detection device 30, and the vehicle control device 40. In the following discussion, a vehicle equipped with the vehicle control system 1 will also be referred to as a system vehicle.

The image capturing device 10 is made of a known CCD or CMOS camera equipped with an image sensor in which image sensing devices, such as CCDs or CMOSs, are two-dimensionally arrayed. The image capturing device 10 works to capture a frontal view ahead of the system vehicle and deliver a captured image to the lane detection device 30 in a given imaging cycle. The image captured by the image capturing device 10 is a color image whose colors are discriminable from each other. For example, the image capturing device 10 is, as illustrated in FIG. 3, mounted near a rear-view mirror of the system vehicle to have an imaging range, as illustrated in FIG. 2, on a frontal road surface.

The sensor group 20 includes at least a vehicle speed sensor and a yaw rate sensor and works to detect the position of the system vehicle and behavior, such as the speed, of the system vehicle. The sensor group 20 may also include a pitch angle sensor or a steered angle sensor. The position and behavior of the system vehicle are stored in the memory 32 which will be described later.

The vehicle control device 40 works to control an operation of the system vehicle in response to an output from the lane detection device 30. For example, the vehicle control device 40 sounds an alarm to alert the driver of the system vehicle or performs a known lane keeping function (also called lane keeping assist) to control steering of the system vehicle. For example, the vehicle control device 40 is equipped with a lane departure warning system.

The lane detection device 30 is mainly implemented by a known microcomputer equipped with a CPU 31 and semiconductor devices, such as a RAM, a ROM, and a flash memory. Various functions of the lane detection device 30 are achieved in the CPU 31 by executing logical programs stored in a non-transitory tangible storage medium. In this embodiment the memory 32 is made of the non-transitory tangible storage medium. The programs are executed to perform given tasks required by the vehicle control system 1. The lane detection device 30 may be made of one or a plurality of microcomputers.

The lane detection device 30 realizes a lane detection operation, as will be described later in detail, by executing the program using the CPU 31. All or some of the functions of the lane detection device 30 may be achieved by using one or some hardware devices as well as software. For instance, the functions may be implemented by a hardware electronic circuit(s) made of a digital circuit including a plurality of logical circuits, an analog circuit, or a combination thereof.

Lane Detection Task

Figure 4:
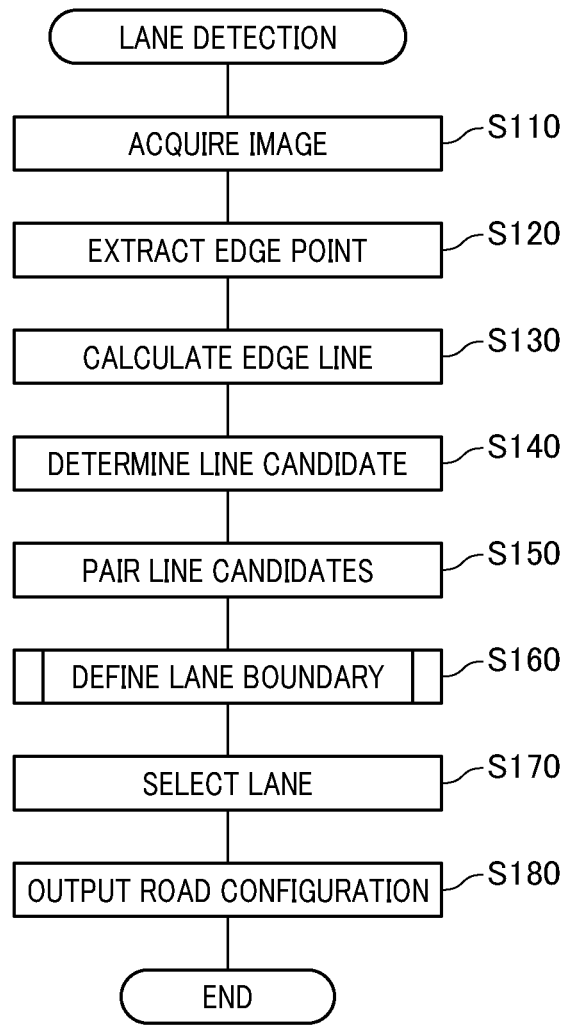
FIG. 4 is a flowchart of a lane detecting operation executed by a lane detection apparatus of an embodiment.

Next, the lane detection operation executed by the lane detection device 30 will be described below with reference to FIG. 4. FIG. 4 is a flowchart of a sequence of logical steps or program performed by the lane detection device 30. The program is initiated upon turning on of an ignition switch installed in the system vehicle and executed cyclically until the ignition switch is turned off. In the following discussion, a cycle in which the lane detection operation is performed will also be referred to as a lane detection cycle.

After entering the program of FIG. 4, the routine proceeds to step S110 wherein the lane detection device 30 obtains an image captured by the image capturing device 10. For instance, the captured image contains at least one lane line (e.g., striped markings) demonstrated in FIG. 5. The lane line or marking, as referred to herein, contains not only a line printed on the surface of the road, but also an object appearing in the shape of a line in the captured image. The routine then proceeds to step S120 wherein the lane detection device 30 extracts edge points from the image. The edge points, as referred to herein, are expressed by dots representing a boundary between the lane line and another area on the road. Specifically, the edge extraction is, as demonstrated in FIG. 6, achieved by detecting a pixel on the captured image which has an absolute value of an edge strength higher than or equal to a given strength threshold as an edge point Ep. The edge strength is a difference in brightness level of one of the pixels between itself and the adjacent pixel on the captured image. The edge strength of each of the edge points Ep is stored in the memory 32. In this disclosure, when the captured image is scanned from left to right, one of the edge points where the brightness level has been changed from lower to higher is referred to as an up-edge point, while one of the edge points where the brightness level has been changed from higher to lower is referred to as a down-edge point. The lane detection device 30 pairs each up-edge point with one of the down-edge points which is located on the right side of and closest to that up-edge point.

After step S120, the routine proceeds to step S130 wherein the lane detection device 30 defines an edge line EI. Specifically, the lane detection device 30, as demonstrated in FIG. 7, selects a first edge point that is each of the edge points, as extracted in step S120, and a second edge point that is one of the edge points which lies in a given edge range away from the first edge point and define a line extending between the first edge point and the second edge point as the edge line EI. The given edge range corresponds to, for example, a given number of horizontal arrays of pixels in the captured image.

The routine proceeds to step S140 wherein the lane detection device 30 determines line candidates. Specifically, each of the line candidates is a line Ht which is, as demonstrated in FIG. 8, derived by performing a Hough transform on the edge points making the edge lines. The Hough transform is a known technique of extracting a feature, as expressed by a function of a straight or a curved line, from an image. The line candidates are, as demonstrated as the lines Ht in FIG. 8, represented by lines each extending along a distribution of the edge points.

The routine proceeds to step S150 wherein the lane detection device 30 pairs each of the line candidates with another line candidate. Specifically, the lane detection device 30 determines a first line candidate that is one of the line candidates and a second line candidate that is one of the line candidates which is different from the first line candidate and defined by the edge points paired with those defining the first line candidate. The lane detection device 30 then defines the first line candidate and the second line candidate as a line candidate pair which represents one lane line.

The line candidates, the line candidate pairs, the lane line, and features thereof, as derived by the lane detection device 30, are stored in the memory 32. For instance, the features stored in the memory 32 include a curvature of each of the line candidates, the number of the edge points belonging to each of the line candidates, a color of a lane line represented by each of the line candidate pairs, a distance of each of the line candidates, a distance to an apoapse (i.e., a furthest point, which will also be referred to below as an apoapse distance) of each of the line candidates, a line-to-line distance between lane lines represented by the line candidate pairs, and a positional relation between the system vehicle and each of the line candidates.

Figure 9:
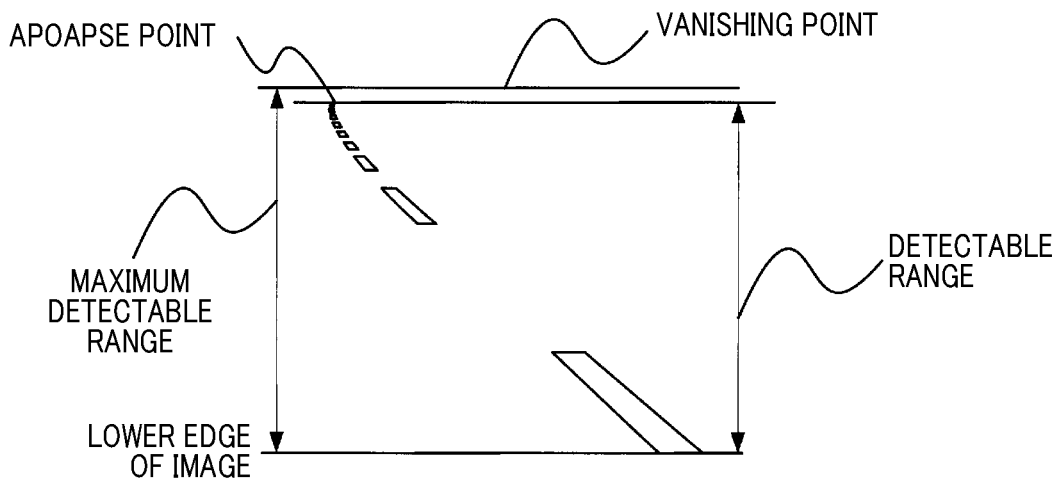
FIG. 9 is a view which shows how to calculate a detectable range parameter.

The color of each of the lane lines indicated by the line candidate pair may be determined by colors of pixels lying between the line candidates which form the line candidate pair. The apoapse distance, as referred to herein, is a distance between the system vehicle and a farthest perceived portion of the line candidate in a space expressed by the captured image from which the line candidate is extracted. For instance, in the case where an image illustrated in FIG. 9 is captured, of the edge points belonging to each of the line candidates, one which is located farthest away from the system vehicle (i.e., an uppermost one, as viewed in FIG. 9) is defined as an apoapse point. The distance between a lower edge of the image (i.e., the system vehicle), as viewed in FIG. 9, and the apoapse point is determined as the apoapse distance. The curvature of each of the line candidates may be calculated by defining a circle extending along the edge points of the line candidate using, for example, a known least-square technique.

Figure 10:
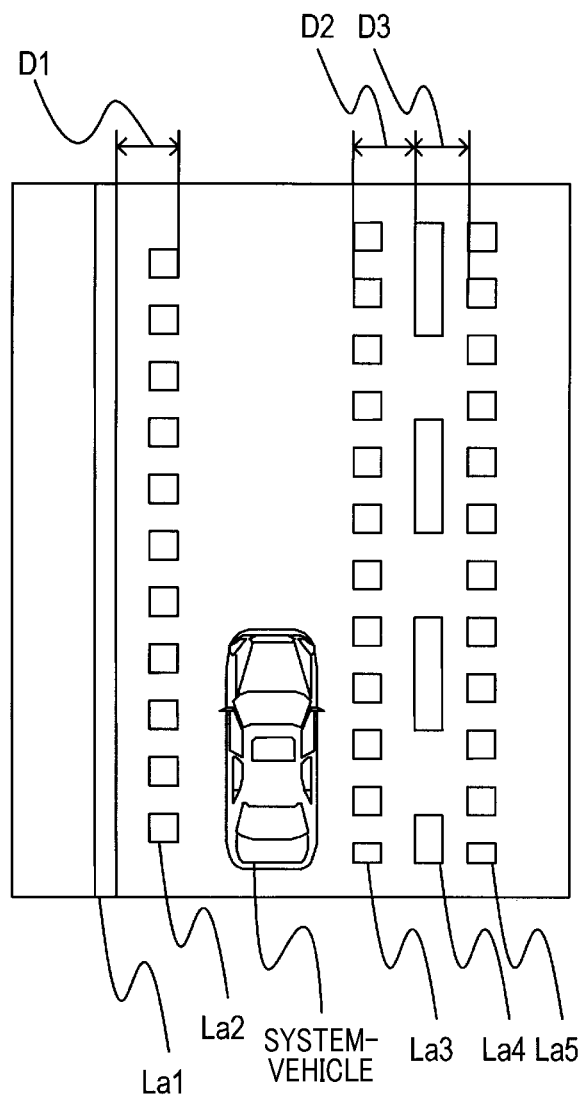
FIG. 10 is a view which shows lane lines on a road on which a system vehicle is moving.

The positional relation between the system vehicle and each of the line candidates, as referred to herein, is a distance between the center of the system vehicle and the line candidate in the width-wise direction of the system vehicle. Of the line candidates which form the line candidate pair, the position of one which is closer to the system vehicle is determined as the position of the lane line. The line-to-line distance between the lane lines, as referred to herein, is an interval between the lane lines in the width-wise direction of the system vehicle. For instance, in the case where an image, as demonstrated in FIG. 10, is captured, the line-to-line distance is a distance D1, D2, or D3 between adjacent two of the line candidate pairs La1 to La5 in the width-wise direction of the system vehicle.

The routine then proceeds to step S160 wherein the lane detection device 30 defines lane boundaries (also called lane boundary lines) in a way, as will be described later in detail.

The routine proceeds to step S170 wherein the lane detection device 30 selects or determines a lane on which the system vehicle exists or is now moving. Specifically, of the lane boundary lines, as derived in step S160, the lane detection device 30 selects two: one (which will also be referred to below as a right lane boundary) being located on the right side of the system vehicle and closest to the system vehicle, and the other (which will also be referred to below as a left lane boundary) being located on the left side of the system vehicle and closest to the system vehicle. The lane detection device 30 determines the right and left lane boundary lines as boundaries of the lane on which the system vehicle is now traveling (which will also be referred to as a system-vehicle lane).

The routine proceeds to step S180 wherein the lane detection device 30 outputs the boundaries of the lane, as derived in step S170, to the vehicle control device 40 for use in determining a configuration of the lane on the road in which the system vehicle is now moving.

The operation in step S110 constitutes an example of an image acquisition unit. The operation in step S120 constitutes an example of an edge extraction unit. The operations in step S150 constitute examples of a line candidate determining unit, a distance determining unit, a curvature determining unit, a curvature storing unit, and a relation determining unit. The operations in steps S120 to S150 constitute an example of a lane line detecting unit. The operations in step S120 to S160 constitute an example of an image processing unit.

Lane Boundary Definition

The lane boundary definition performed by the lane detection device 30 in step S160 will be described below with reference to a flowchart of FIG. 11. Steps S210 to S230 represent a feature extraction operation which is cyclically performed. Steps S240 to S260 represent a grouping operation which is cyclically performed. Steps S270 to S330 represent a lane boundary determining operation which is cyclically performed.

After entering step S160 of FIG. 4, the routine proceeds to step S210 wherein the lane detection device 30 extracts or selects one of the lane lines, as indicated by the line candidate pairs. The lane line currently selected is one of the lane lines which were not yet extracted in previous cycles of the feature extraction operation in step S210.

The proceeds to step S220 wherein the lane detection device 30 extracts feature from the lane line selected in step S210. The features include the type (which will also be referred to as a line type) and chromaticity of the lane line selected in step S210. The line type, as referred to herein, is expressed by the configuration of the lane line, such as a solid line or a broken line. The line type is determined by using, for example, an interval between edge lines belonging in the line candidates forming the line candidate pair in a direction in which the line candidates extend. The color of the lane line is determined based on the chromaticity thereof. The line type and chromaticity of the lane line, as determined by the lane detection device 30, are stored in the memory 32.

The routine proceeds to step S230 wherein the lane detection device 30 determines whether there are the lane lines which were not yet extracted or not. If a YES answer is obtained in step S230, then the routine returns back to step S210 to select one of the unextracted lane line cyclically.

Alternatively, if a NO answer is obtained meaning that there are no unextracted lane lines, then the routine proceeds to step S240 wherein one of the lane lines is selected. The lane line currently selected is one of the lane lines which were not yet grouped in previous cycles of the grouping operation in step S240.

The routine proceeds to step S250 wherein the lane detection device 30 groups the lane lines. Specifically, at least two of the lane lines selected in step S240 which lie in a range (which will also be referred to below as a grouping range) predetermined in the width-wise direction of the system vehicle are grouped together as a lane line group. For instance, when there are a first lane line that is one of the lane lines selected in step S240 and a second lane line that is one of the lane lines different from the first lane line and located within a given distance (i.e., the grouping range) away from the first lane line in the width-wise direction of the system vehicle, they are grouped together as the lane line group. Alternatively, when there are no lane lines within the grouping range other than the first lane line, only the first lane line is defined as the lane line group. The grouping range is selected to be, for example, three times the width of the lane line, in other words, to be a range for discriminating among a multiple-line marking (e.g., a double-line marking), a complex-line marking, and a single-line marking. The position of the lane line may be determined by the position of the line candidates forming such a lane line.

The routine proceeds to step S260 wherein the lane detection device 30 determines whether there are the lane lines which are not yet grouped. If a YES answer is obtained meaning that there are the ungrouped lane lines, then the routine returns back to step S240.

Alternatively, if a NO answer is obtained meaning that there are no ungrouped lane lines, then the routine proceeds to step S270 to perform the lane boundary determining operation.

In step S270, one of the lane line groups is selected. This selection is made to select one from the lane line groups which were not yet selected in previous cycles of the lane boundary determining operation in step S270.

The routine proceeds to step S280 wherein the lane detection device 30 determines whether the lane line group selected in step S270 has two or more lane lines or not. If a NO answer is obtained meaning that there are not two or more lane lines in the lane line group, in other words, the lane line group has only one lane line, then the routine proceeds to step S290.

Alternatively, if a YES answer is obtained in step S280 meaning that the lane line group has two or more lane lines, then the routine proceeds to step S300.

Figure 12:
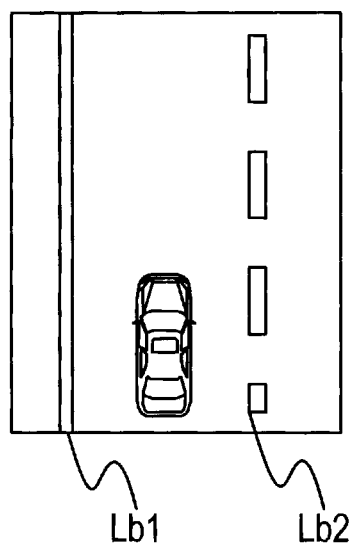
FIG. 12 is a view which demonstrates a case where there are no multiple-line markings on right and left side of a system vehicle.

In step S290, the lane detection device 30 determines the lane line of the group selected in step S270 as a lane boundary line on the road. Specifically, in an example of the road illustrated in FIG. 12 where each of the lane line Lb1 and the lane line Lb2 exists only in itself within the grouping range away therefrom in the width-wise direction of the system vehicle, the lane detection device 30 determines each of the lane lines Lb1 and Lb2 as the lane boundary line which defines a boundary of the lane on which the system vehicle is now moving. After step S290, the routine proceeds to step S330.

In step S300, the lane detection device 30 determines the lane lines contained in the lane line group selected in step S270 as a selected multiple-line marking. The lane detection device 30 also defines an interval between the lane lines, as determined as the selected multiple-line marking, as a line-to-line distance in the width-wise direction of the system vehicle. For instance, if the lane line group selected in step S270 contains three lane lines, an interval between every two of the lane lines is determined as the line-to-line distance.

The routine proceeds to step S310 wherein the lane detection device 30 selects, of the lane lines which are determined as the selected multiple-line marking, one which is relatively more useful in calculating the configuration of the lane in which the system-vehicle exists and determines the selected one as a reference line. For example, one of the lane lines which is smaller in change in curvature thereof is selected as the reference line. The selection of the reference line will also be described later in detail.

The routine proceeds to step S320 wherein the lane detection device 30 determines the lane boundary using the type of the lane lines forming the selected multiple-line marking. The determination of the lane boundary will be described later in detail.

The routine proceeds to step S330 wherein it is determined whether or not there is a lane line group(s) which is not yet selected until this cycle of the lane boundary determining operation in step S270.

If a YES answer is obtained in step S330 meaning that there is an unselected lane line group, then the routine returns back to step S270.

Alternatively, if a NO answer is obtained in step S330 meaning that there is no lane line group which has not yet been selected until this cycle of lane boundary determining operation, then the routine terminates.

The operation in step S220 constitutes a line feature extraction unit and a chromaticity determining unit. The operation in step S280 constitutes a multiple-line marking determining unit. The operation in step S300 constitutes a line-to-line interval determining unit and a line-to-line interval storage unit. The operation in step S310 constitutes a reference line selecting unit.

Reference Line Selection

The selection of the reference line made by the lane detection device 30 in step S310 will be described below in detail with reference to a flowchart of FIG. 13. The calculation and aggregation of parameters, as discussed below, are made for each of the detected lane lines, that is, the lane lines forming the selected multiple-line marking derived in step S270.

Figure 11:
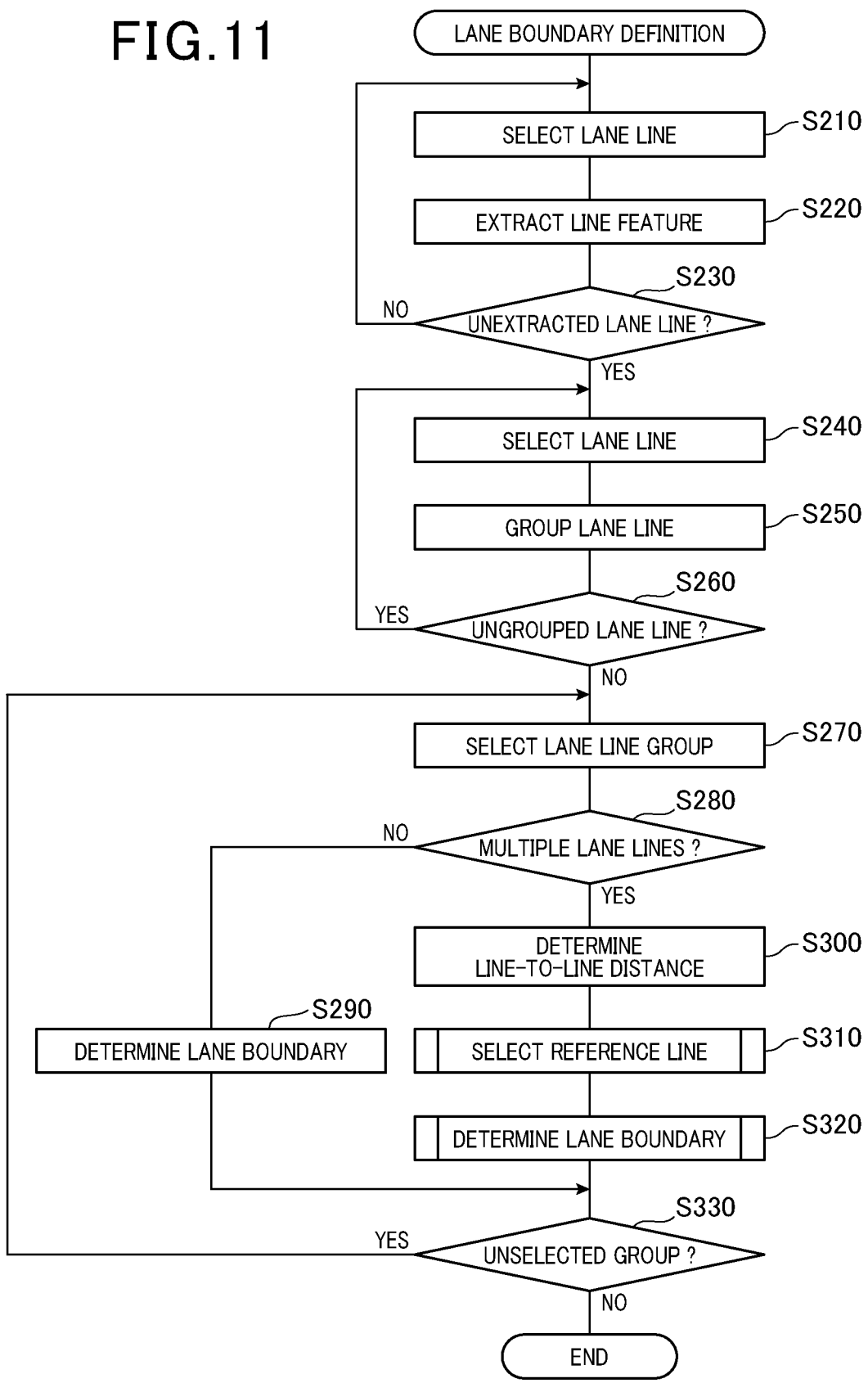
FIG. 11 is a flowchart of a lane boundary determining program.
Figure 13:
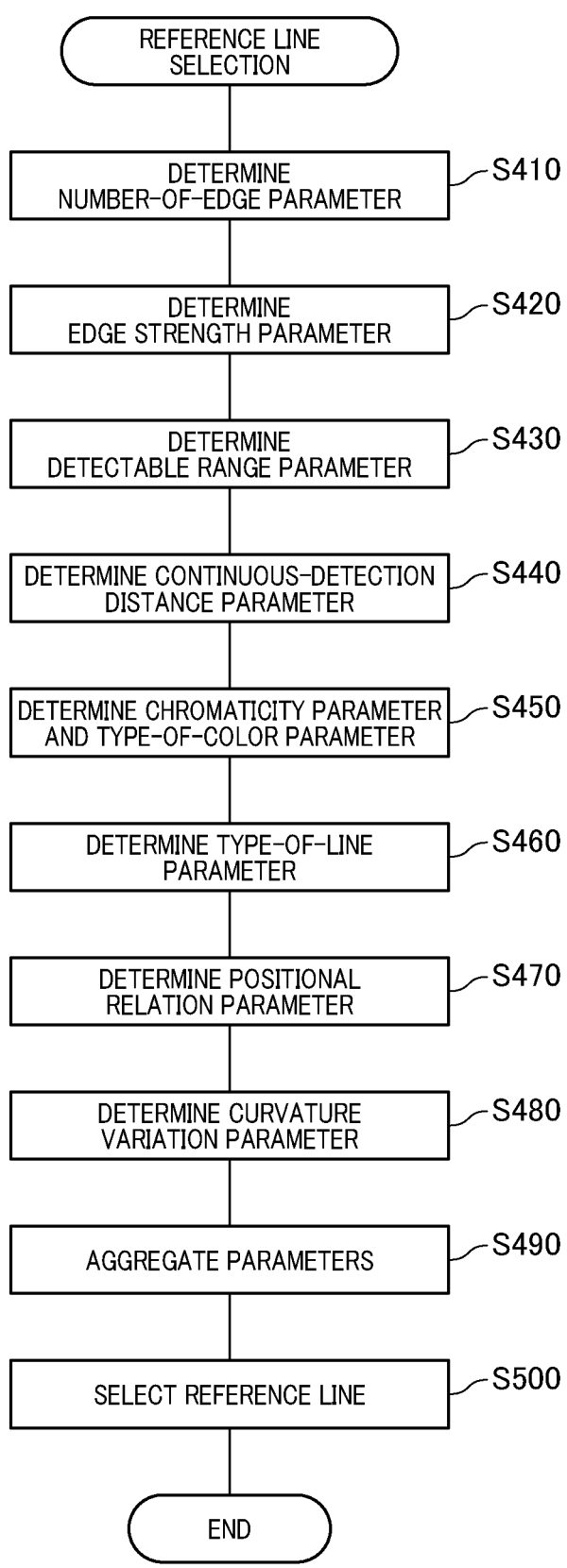
FIG. 13 is a flowchart of a reference line selecting program.

When entering in step S310 of FIG. 11, the routine proceeds to step S410 of FIG. 13 wherein the lane detection device 30 derives the number of edges contained in a selected one of the lane lines to determine a number-of-edge parameter. For example, the number-of-edge parameter is a parameter indicating a ratio of the calculated number of edges to a given maximum value. The maximum value is an expected maximum possible number of edges forming a single lane line. The number of edges in the lane line, as used here, has already been stored by the lane detection device 30 in the memory 32 in step S120.

The routine proceeds to step S420 the lane detection device 30 determines an edge strength parameter as a function of the strength of an edge contained in the lane line. For example, the edge strength parameter is a parameter indicating a ratio of the strength of the detected edge of the lane line to a given maximum value. The strength of the edge, as used here, has already been stored by the lane detection device 30 in the memory 32 in step S120. The maximum value of the edge strength is given by, for example, a difference between a maximum possible level and a minimum possible level of brightness of the pixel. When there are a plurality of edges contained in the lane line, an average of strengths of the edges is used as the edge strength of the lane line in step S420.

The routine proceeds to step S430 wherein the lane detection device 30 determines a detectable range parameter as a function of the apoapse distance of the lane line. For example, a distance between a lower edge to a vanishing point (i.e., an upper edge) of the captured image in FIG. 9 is defined as a maximum detectable range. The detectable range parameter is expressed as a ratio of the apoapse distance to the maximum detectable range. The apoapse distance, as used herein, is given by that stored in the memory 32 in step S150.

The routine proceeds to step S440 wherein the lane detection device 30 determines a continuous-detection distance parameter as a function of a distance for which the lane line is continuing to be detected. In other words, the lane detection device 30 works to calculate a distance for which the system vehicle has traveled and determine the continuous-detection distance parameter as representing the distance the system vehicle has moved while the lane line was continuously being detected. The continuous-detection distance parameter, as referred to herein, is given by a ratio of a distance the system vehicle has traveled while the lane line was continuing to be detected to a given reference distance. The reference distance is a predetermined constant distance. For example, the above described distance for which the lane line is continuously being detected may be derived as a function of a time elapsed from a time at which the lane line was stored in the memory 32 in step S150 up to now and a speed of the system vehicle measured by the sensor group 20.

The routine proceeds to step S450 wherein the lane detection device 30 determines a chromaticity parameter and a type-of-color parameter using the color of the lane line. The chromaticity parameter is defined by, for example, a reciprocal of a variation in chromaticity in the lane line. In other words, the chromaticity parameter has a value which increases with a decrease in variation in chromaticity in the lane line. The type-of-color parameter is defined as a value which increases with an increase in measure of matching of the type of color of the lane line, as derived in step S150, with a reference type of color which is predetermined to have a higher probability that it represents the lane boundary line. For example, comparing between a white-colored lane line and an orange-colored lane line, the white-colored lane line may be determined as being more useful in calculating the configuration of the lane. Specifically, when the type of color of the lane line stored in the memory 32 in step S220 is white, the lane detection device 30 may determine the chromaticity parameter as being higher in level than that when the color of the lane line is orange. The chromaticity, as used herein, is given by that stored in the memory 32 in step S220.

The routine proceeds to step S460 wherein the lane detection device 30 determines a type-of-line parameter based on the type of the lane line. The type of the lane line, as used herein, is the line type stored in the memory 32 in step S220. The type-of-line parameter is determined by, for example, assigning parameters to respective possible configurations of the lane line, such as a solid line and a broken line, and selecting one of such parameters which matches the lane line selected in this execution cycle of the program of FIG. 13. The parameter assigned to the solid line may have a value greater than that assigned to the broken line.

The routine proceeds to step S470 wherein the lane detection device 30 determines a positional relation parameter based on the positional relation between the system vehicle and the lane line stored in the memory 32 in step S150. The positional relation parameter, as used herein, is calculated using, for example, a positional relation between the center of the system vehicle and the lane line. For example, the positional relation parameter has a maximum value when the lane line lies at the center of the system vehicle and decreases as the lane line is located farther away from the system vehicle in the width-wise direction of the system vehicle. In other words, the positional relation parameter has a value increasing with a decrease in interval between the lane line and the system vehicle.

The routine proceeds to step S480 wherein the lane detection device 30 works as a variation determining unit to determine a curvature variation parameter using curvatures of the lane line. The curvature of the lane line, as used herein, is given by that stored in the memory 32 in step S150. The curvature variation parameter, as used herein, is calculated as function of a variation in curvature of the lane line and defined by, for example, a ratio of a variation between curvatures of the same lane line calculated for a given number of previous lane detection cycles to a given maximum value. The maximum value is provided when the variation in curvature of the lane is zero. Specifically, the curvature variation parameter is defined by a reciprocal of the variation in curvature of the lane line.

The routine proceeds to step S490 wherein the lane detection device 30 aggregates the parameters derived in steps S410 to S480 as a total parameter. Specifically, the lane detection device 30 adds up or alternatively multiplies all the parameters together. A given weight may be added to each of the parameters. The weights may be determined as a function of degrees of importance of the respective parameters. The lane detection device 30 may aggregate only some of the parameters derived in steps S410 to S480 as the total parameter.

The routine proceeds to step S500 wherein the lane detection device 30 selects, as the reference line, one of the lane lines which has the total parameter greatest among those as derived for the respective lane lines in step S490.

By the above described reference line selecting operation, one of the detected lane lines which is relatively useful in determining the configuration of the lane is selected as the reference line. In this disclosure, the parameter derived in each of steps S410 to S480 is also referred as a lane line parameter. The operations in steps S410 to S490 constitute a parameter extraction unit. The operation in step S440 constitutes a continuous-detection distance determining unit.

Lane Boundary Determination

Figure 14:
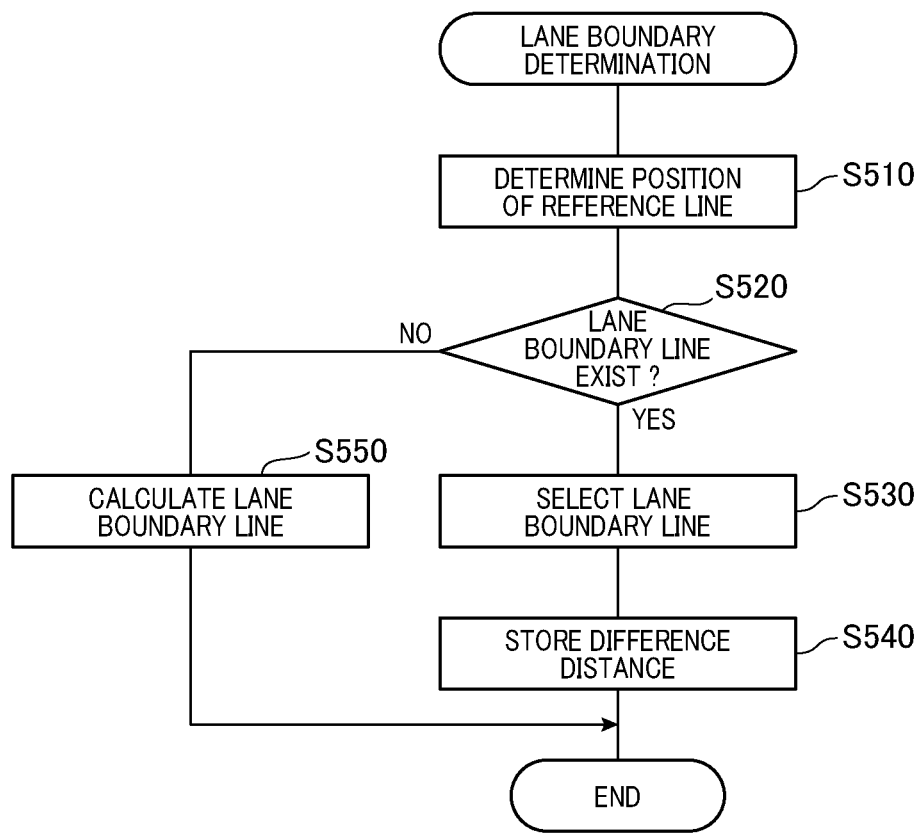
FIG. 14 is a flowchart of a lane boundary line determining program.

The lane boundary determining operation executed by the lane detection device 30 in step S320 will be described below in detail with reference to a flowchart of FIG. 14.

When entering step S320, the routine proceeds to step S510 wherein the lane detection device 30 determines the position of the reference line selected in step S310.

The routine proceeds to step S520 wherein the lane detection device 30 determines whether the lane boundary line exists in the lane line group selected in step S270 or not using, for example, a pattern matching technique. This is made using the types of the lane lines forming the selected lane line group. The type of the lane line, as used herein, is the line type stored in the memory 32 in step S220. Specifically, it is determined whether each of the lane lines of the selected lane line group matches the configuration of the lane boundary line such as the center line on the road or not. If one of the lane lines is determined as matching the configuration of the lane boundary line, the one of the lane lines is selected as the lane boundary line existing in the selected lane line group.

If a YES answer is obtained in step S520 meaning that there is the lane boundary line, then the routine proceeds to step S530 wherein the lane detection device 30 corrects one of the lane lines, as selected as the lane boundary line in step S520, and determines it as the lane boundary line. For example, when one of the lane lines selected as the lane boundary line in step S520 is determined as matching the reference line derived in step S510, the lane detection device 30 corrects or offsets the position of the reference line by zero and determines it as the position of the lane boundary line. Alternatively, when one of the lane lines selected as the lane boundary line in step S520 is determined as unmatching the reference line, the lane detection device 30 corrects or offsets the position of the reference line using one of the line-to-line distances derived in step S300 in this cycle in a way similar to that used in step S550 which will be described below in detail. The matching between one of the lane lines and the reference line may be achieved using the line-to-line distances derived in step S300, The routine proceeds to step S540 wherein the lane detection device 30 determines the line-to-line distance between the lane boundary line, as derived in step S530, and each of the other lane lines in the selected lane line group, and stores it in the memory 32 as a difference distance. The line-to-line distances, as used herein, are those derived in step S300.

Alternatively, if a NO answer is obtained in step S520 meaning that there is no lane boundary line, then the routine proceeds to step S550 wherein the lane detection device 30 defines the position of the lane boundary line using one of the difference distances, as stored in the memory 32 in step S540 in previous cycles of the lane boundary line determining operation, and the position of the reference line derived in step S510. Specifically, the lane detection device 30 assumes or defines the lane boundary line as lying at a position the difference distance away from the reference line. More specifically, the lane detection device 30 selects one of the difference distances, as stored in the memory 32 in step S540, which corresponds to the reference line determined in step S510, in other words, which is the line-to-line distance, as derived in step S540 in the previous cycle, between the reference line viewed as being the same as that derived in step S510 in this cycle and the lane boundary line. The lane detection device 30 then corrects or offsets the position of the reference line by the selected difference distance and determines it as the position of the lane boundary line.

Figure 15:
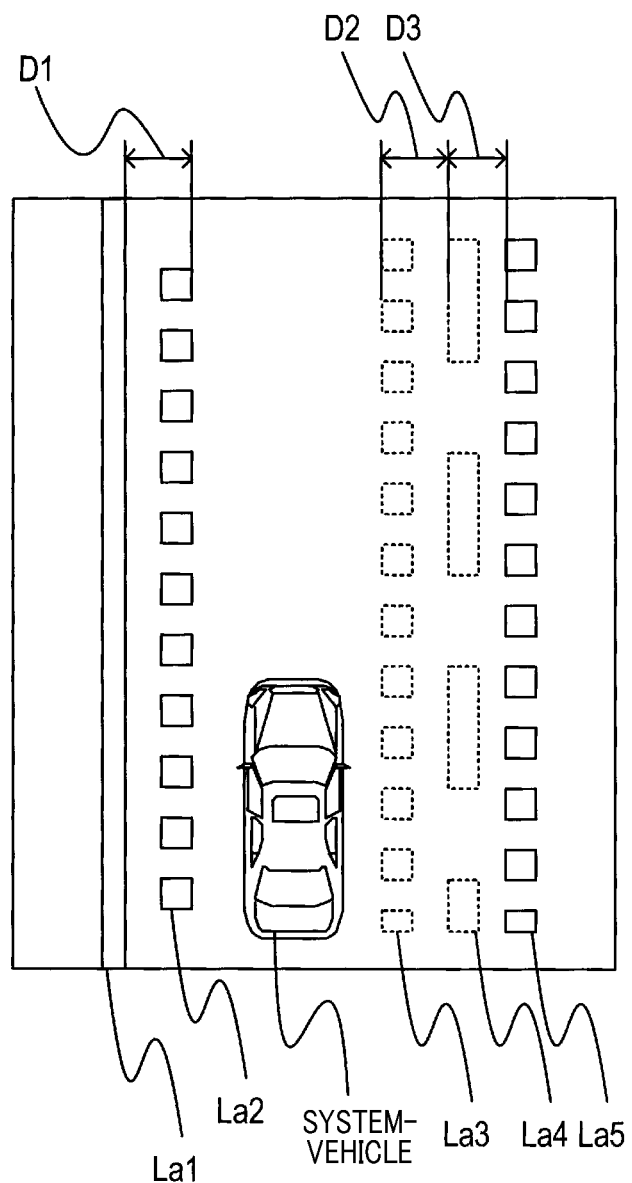
FIG. 15 is a view which demonstrates a lane line which has worn, blurred, or faded portions.

For instance, in a case of FIG. 15 where the lane boundary line La4 which is on the right side of the lane on which the system vehicle is moving has worn, blurred, or faded, when the lane line La5 is selected as the reference line, the position of the lane boundary line La4 is calculated using the position of the lane line La5 and the difference distance D3. In other words, the lane detection device 30 calculates the lane boundary line as lying at a position the difference distance D3 away from the reference line (i.e., the lane line La5) toward the system vehicle.

The operation in step S550 constitutes a boundary calculating unit.

In the above described lane boundary determining operation, the position of the lane boundary line which represents the configuration of the road (i.e., the lane) is determined.

Beneficial Effects

The above embodiment offers the following advantages.

Figure 16:
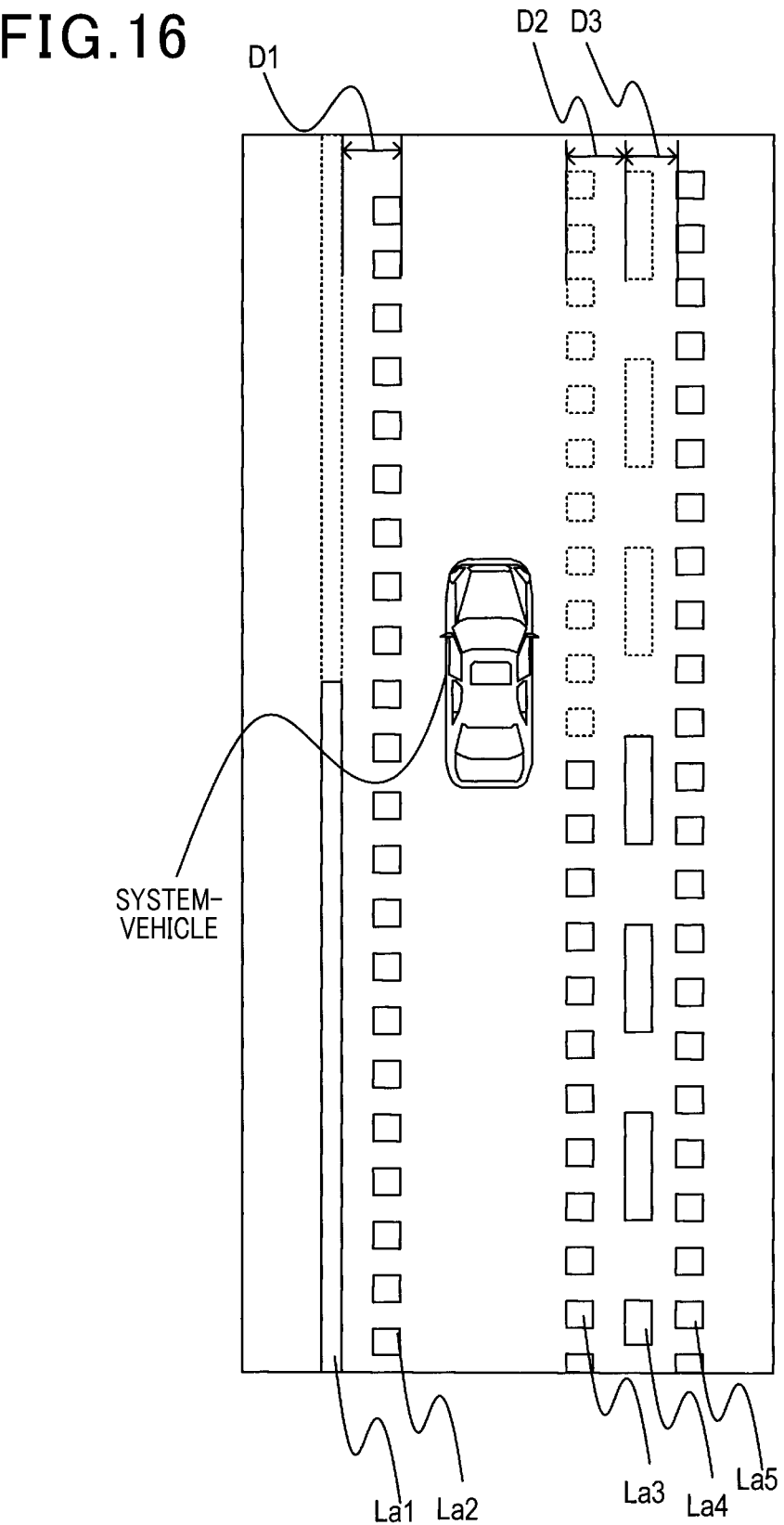
FIG. 16 is a view which demonstrates a lane line which is partially worn on a portion of a road.

1a) The lane detection apparatus of the embodiment is designed to store the position of the reference line in the memory 32 and calculate the position of the lane boundary line using the difference distance and the position of the reference line when the lane boundary line is determined not to exist in the selected lane line group. One of the lane lines which is most useful in calculating the configuration of the lane is selected as the reference line, thereby enhancing the accuracy in estimating the position of the lane boundary line. The configuration of the lane is expressed by the position of the lane boundary line, thereby improving the accuracy in determining the configuration of the lane outputted from the lane detection device 30. For instance, in the case of FIG. 16 where each of the lane lines La2 and La5 is determined as the reference line, and the lane boundary line La1 and the lane boundary line La4 have worn or faded, the position of the lane boundary line La1 is determined using the lane line La2 and the difference distance D1. Similarly, the position of the lane boundary line La4 is determined using the lane line La5 and the difference distance D3. The position of the lane boundary line is calculated using the difference distance stored in the memory 32 and then outputted as representing the configuration of the lane. In other words, even when the lane boundary line has worn or faded, the lane detection apparatus is capable of determining the position of the lane boundary line using the difference distance stored in the memory 32.

1b) The lane detection apparatus of the embodiment is capable of improving the reliability in calculating the configuration of the lane. Specifically, one of the lane lines which has the greatest total parameter which is derived by aggregating the various types of parameters for each of the lane lines is, as described above, selected as the reference line. In other words, the selection of the reference line is achieved by using all the parameters, such as the curvature of the lane lines and the detectable range of the captured image, thereby ensuring a higher degree of reliability in determining the reference line than using a single parameter. Even if all the parameters associated with one of the lane lines have failed to be derived, it is possible to select the reference line with a higher degree of reliability than using a single parameter.

Modifications

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended claims.

2a) The lane detecting apparatus of the embodiment is, as described above, designed to calculate the edge line by selecting a first edge point that is one of the extracted edge points and a second edge point that is one of the edge points which lies in a given edge range away from the first edge point and defining a line extending between the first edge point and the second edge point as the edge line EI. The calculation of the edge line may alternatively be made in another way. For instance, the edge line may be determined using a segmentation technique. Specifically, the segmentation is achieved by forming a line (which will also be referred to as a first line) extending between two adjacent edge points (which will also be referred to as a first and a second edge point) and, when there is a third edge point on a line (which will also be referred to a second line) extending from the first line within a given range, defining an edge line extending through the first, second, and third edge point. The edge line may alternatively be derived, like in calculation of the line candidates, performing a Hough transform on the edge points.

Figure 17:
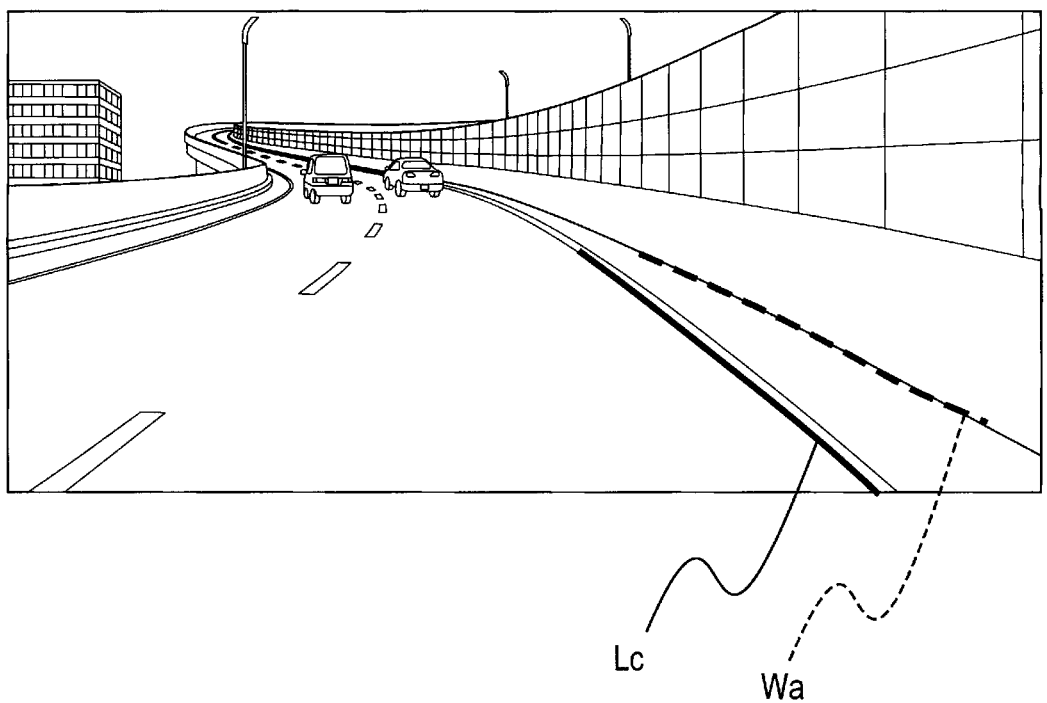
FIG. 17 is a view which illustrates detection of a lane boundary line in a modification of an embodiment.

2b) The lane detecting apparatus of the embodiment is, as described above, designed to recognize the lane boundary line using the position of the reference line, but however, it may alternatively be achieved in another way. If a positional relation between the lane boundary line and a selected feature (also called a landmark) is predetermined, the lane detecting apparatus may calculate the position of the feature, determine it as the position of the reference line, and calculate the position of the lane boundary line using the position of the reference line. For instance, when the position Wa of a side wall on the lane demonstrated in FIG. 17 is used as the position of the feature, it improves the accuracy in recognizing the lane boundary line because there is a lower probability that the side wall is worn or faded than the lane lines, and the side wall is associated with the configuration of the road (i.e., the lane).

2c) In the above case, the lane boundary may be determined using only one of the position of the reference line and the position of the feature. Further, the position of the lane boundary line may be calculated by weighting the positions of the reference line and the feature depending upon to which of them a higher priority should be assigned.

2d) In the above embodiment, a plurality of functions of one of the components of the lane detecting apparatus may be shared with two or more of the components. A single function of one of the components may be achieved by two or more of the other components. Alternatively, two or more functions of two of more of the components may be performed by only one of the components. A single function performed by two or more of the components may be achieved by one of the components. The components of the above embodiment may be partially omitted.

2e) The above described lane detection may be achieved in one of various modes: a lane detection system equipped with the above lane detection apparatus, a logical program executed by a computer which realizes the lane detection apparatus, a non-transitory tangible storage medium, such as a semiconductor memory, which stores the program, and a lane detection method.

What is claimed is:

1. A lane detection apparatus comprising:
   an image acquisition unit which acquires an image in a given lane detection cycle which is captured by an image capturing device mounted in a vehicle; and
   an image processing unit which includes a lane line detecting unit, a parameter extraction unit, a multiple-line marking determining unit, and a reference line selecting unit,
   the lane line detecting unit being configured to detect lane lines on a road in the captured image obtained by the image acquisition unit,
   the parameter extraction unit being configured to extract at least one type of lane line parameters for the respective lane lines detected by the lane line detecting unit in calculating a configuration of a lane on the road in which the vehicle exists,
   the multiple-line marking determining unit being configured to determine whether a first lane line and a second lane line constitute a multiple-line marking or not, the first lane line being one of the lane lines detected by the lane line detecting unit, the second lane line being one of the lane lines which is different from the first lane line, and
   the reference line selecting unit being configured to, based on the first lane line and the second lane line being determined to form the multiple-line marking, select one of the first and second lane lines which is determined to have a higher total parameter value in calculating the configuration of the lane using the lane line parameters, as derived by the parameter extraction unit, and determine the selected one as a reference line for use in determining the configuration of the lane on the road in which the vehicle exists,
   wherein the parameter extraction unit extracts a plurality of types of lane line parameters, one for each of the lane lines, wherein the reference line selecting unit adds up the plurality of types of lane line parameter values for each of the lane lines together using weights to derive a total parameter value, and wherein the reference line selecting unit determines the reference line using the total parameter value.

2. A lane detection apparatus as set forth in claim 1, further comprising a distance determining unit configured to determine an apoapse distance that is a distance between said vehicle and an apoapse point, the apoapse point being one of points on the captured image which are used to detect the lane lines in the lane line detecting unit, the apoapse point being located farthest away from said vehicle, and the parameter extraction unit extracts a detectable range parameter as each of the lane line parameters, the detectable range parameter having a value increasing with an increase in the apoapse distance.

3. A lane detection apparatus as set forth in claim 1, further comprising a curvature determining unit, a curvature storing unit, and a variation determining unit, the curvature determining unit being configured to cyclically determine a curvature of each of the lane lines, as detected by the lane line detecting unit, the curvature storing unit being configured to store the curvatures of the lane lines determined by the curvature determining unit, the variation determining unit being configured to determine a variation between the curvatures of each of the lane lines which are stored in the curvature storing unit for a given number of cycles, and wherein the parameter extraction unit determines a curvature variation parameter as each of the lane line parameters, the curvature variation parameter having a value increasing with a decrease in the variation in curvature.

4. A lane detection apparatus as set forth in claim 1, wherein the lane line detecting unit includes an edge extraction unit which is configured to detect an edge point which is expressed by a dot representing a boundary between one of the lane lines and another area on the road in the captured image using an edge strength that is a difference between adjacent brightnesses in the captured image, and wherein the parameter extraction unit determines one of an edge strength parameter and a number-of-edge parameter as each of the lane line parameters, the edge strength parameter having a value increasing with an increase in edge strength of the edge point detected by the lane line detecting unit, the number-of-edge parameter having a value increasing with an increase in number of edge points derived by the lane line detecting unit.

5. A lane detection apparatus as set forth in claim 1, further comprising a chromaticity determining unit which is configured to determine a chromaticity of each of the lane lines detected by the lane line detecting unit, and wherein the parameter extraction unit determines one of a chromaticity parameter and a type-of-color parameter as each of the lane line parameters, the chromaticity parameter having a value which increases with a decrease in variation in chromaticity of the lane line determined by the chromaticity determining unit, the type-of-color parameter having a value which increases with an increase in measure of matching of a type of color of the lane line with a reference type of color which is predetermined to have a higher probability that it represents a lane boundary line which defines the lane of the road.

6. A lane detection apparatus as set forth in claim 1, further comprising a relation determining unit which is configured to determine a positional relation between each of the lane lines detected by the lane line detecting unit and the vehicle, and wherein the parameter extraction unit works to determine a positional relation parameter as each of the lane line parameters, the positional relation parameter having a value increasing with a decrease in interval between a corresponding one of the lane line and the vehicle.

7. A lane detection apparatus as set forth in claim 1, further comprising a continuous-detection distance determining unit which is configured to calculate a distance for which the vehicle moves while each of the lane lines is continuing to be detected by the lane line detecting unit, and wherein the parameter extraction unit works to determine a continuous-detection distance parameter for each of the lane line as each of the lane line parameters, the continuous-detection distance parameter having a value increasing with an increase in the distance determined by the continuous-detection distance determining unit.

8. A lane detection apparatus as set forth in claim 1, wherein the image processing unit corrects the reference line to determine a lane boundary line for use in determining a boundary of the lane.

9. A lane detection apparatus as set forth in claim 8, wherein the image processing unit offsets a position of the reference line by a given distance and determines it as a position of the lane boundary line.

10. A lane detection apparatus as set forth in claim 9, wherein the given distance is determined as a function of an interval between the reference line and one of the lane lines which is selected as a second lane boundary line that is different from a first lane boundary line which is the lane boundary derived by correcting the reference line, the second lane boundary line being derived by a pattern matching technique.

11. A lane detecting method comprising the steps of:
acquiring an image in a given lane detection cycle which is captured by an image capturing device mounted in a vehicle;
detecting lane lines on a road in the captured image obtained by the image acquiring step;
extracting at least one type of lane line parameters for the respective lane lines detected by the lane line detecting step in calculating a configuration of a lane on the road in which the vehicle exists;
determining whether a first lane line and a second lane line constitute a multiple-line marking or not, the first lane line being one of the lane lines detected by the lane line detecting step, the second lane line being one of the lane lines which is different from the first lane line;
selecting, based on the first lane line and the second lane line being determined to form the multiple-line marking, one of the first and second lane lines which is determined to have a higher total parameter value in calculating the configuration of the lane using the lane line parameters, as derived by the parameter extracting step, and determining the selected one as a reference line for use in determining a configuration of a lane on the road in which the vehicle exists; and
correcting the reference line to determine a lane boundary line for use in determining a boundary of the lane,
wherein the correction is achieved by offsetting a position of the reference line by a given distance and determining it as a position of the lane boundary line, and
wherein the given distance is determined as a function of an interval between the reference line and one of the lane lines which is selected as a second lane boundary line that is different from a first lane boundary line which is the lane boundary derived by correcting the reference line, the second lane boundary line being derived by a pattern matching technique.

* * * * *